A. B. Lipsey,

Wrench.

No. 98,698.  Patented Jan. 11, 1870.

Inventor:
Andrew B. Lipsey,
By H. James Weston,
Attorney.

Witnesses:
Edward Brown
Arthur T. Sheldon

United States Patent Office.

ANDREW B. LIPSEY, OF NEW YORK, N. Y.

Letters Patent No. 98,698, dated January 11, 1870.

IMPROVEMENT IN WRENCHES.

The Schedule referred to in these Letters Patent and making part of the same.

*To all whom it may concern:*

Be it known that I, ANDREW B. LIPSEY, of the city, county, and State of New York, have invented certain new and useful Improvements in Wrenches; and I do hereby declare that the following is a full, clear, and exact description thereof, reference being had to the accompanying drawings, and to the letters of reference marked thereon.

My invention relates to that class or kind of wrenches in which one of the jaws is rigidly secured in a fixed position to the shank or extension-bar, and the other jaw is formed and fitted to slide on the same bar, the sliding jaw being moved or operated by a screw-bolt.

My said invention consists in the application to such a wrench, in the manner hereinafter set forth, of a screw-bolt, having a right-hand screw-thread at one part, and a left-hand screw-thread at another part, one of which threads works in a nut or female screw, formed on or in a portion of the said shank, and the other end works in a female screw formed in the sliding jaw.

It also consists in extending one end of the bolt or screw, in the form of a plain pin, through a hole in the ferrule at the inner end of the handle, to give additional strength and stiffness to the working parts. By this arrangement of the parts, the sliding jaw is, by any given number of turns of the screw-bolt, moved twice as far as by the bolt having a single thread of the same pitch and angle.

There is no tendency of the bolt to turn or back out under pressure, no matter how great the angle of the threads may be. These qualities make it very easy and rapid of adjustment, and very firm and rigid, when adjusted to grasp any object within its capacity.

In the accompanying drawings—

Figure 1:
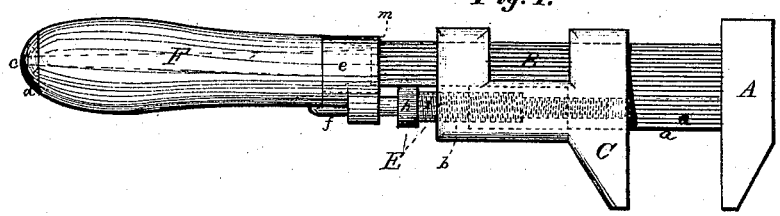
Figure 1 is a side elevation of a wrench embodying my invention.
Figure 2:
Figure 2 is an edge or front view of the same.
Figure 3:
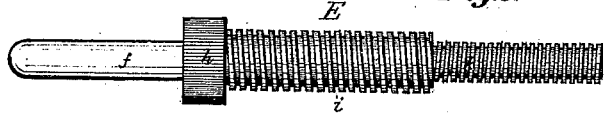
Figure 3 is a side elevation, in detail, of the screw or bolt, on a scale twice as large as that of figs. 1 and 2.

A is the jaw, rigidly fixed to the shank or extension-bar B; and

C is the sliding jaw.

E is the screw-bolt; and

F, the wrench-handle.

The shank has, at the end adjacent to the jaw A, an enlarged or projecting portion, $a$, formed upon it. A hole is made in this enlargement, and the nut or female screw is formed in it, to receive one end of the bolt E. The nut for the other portion of the bolt E is formed in the sliding jaw C, which has a slot in it large enough at one end to admit the enlarged portion $a$ of the shank, and to allow it to enter the jaw until it comes in contact with the nut, shown in dotted lines at $b$, at the moment the jaws come together.

The shank extends through the handle, and is secured by a conical nut, $c$, which is screwed up against a washer, $d$.

The ferrule $e$ has two holes in it, one for the shank and handle, and the other for the pin $f$ to pass through. The former is made square at the inner end $m$, and the square portion of the shank enters it, and prevents its turning around.

A slot, $g$, is formed in the handle for the pin $f$ to slide in, thus preventing the said pin from interfering with the proper handling of the wrench.

The bolt E consists of four parts, the plain guide-pin $f$, which passes through the ferrule $e$, guiding and strengthening the bolt; the roset or hand-nut $h$, for operating the bolt; the right-hand threaded portion $i$, which works in the nut $b$; and the left-hand threaded portion $k$, which works in the nut at $a'$.

Having thus fully described my invention,

- I claim—

1. The combination, in a wrench, of the right and left-hand threaded screw-bolt E with the stationary jaw A, the shank B, and the sliding jaw C, substantially in the manner and for the purpose set forth.

2. The combination, with the bolt E, in a wrench, constructed substantially as described, of the pin $f$ and ferrule $e$, as and for the purpose hereinabove specified.

ANDREW B. LIPSEY.

Witnesses:
 EDWARD BROWN,
 H. JAMES WESTON.